United States Patent
Newton et al.

(10) Patent No.: US 7,813,228 B2
(45) Date of Patent: Oct. 12, 2010

(54) ACCESSING PRE-RECORDED CONTENT ON A RECORD CARRIER

(75) Inventors: Philip Steven Newton, Eindhoven (NL); Declan Patrick Kelly, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 888 days.

(21) Appl. No.: 11/573,951

(22) PCT Filed: Aug. 25, 2005

(86) PCT No.: PCT/IB2005/052785
§ 371 (c)(1),
(2), (4) Date: Feb. 20, 2007

(87) PCT Pub. No.: WO2006/024996
PCT Pub. Date: Mar. 9, 2006

(65) Prior Publication Data
US 2009/0040884 A1    Feb. 12, 2009

(30) Foreign Application Priority Data
Aug. 31, 2004    (EP) .................................. 04104154

(51) Int. Cl.
*G11B 7/085* (2006.01)
(52) U.S. Cl. ........................ 369/30.08; 386/95
(58) Field of Classification Search ............ 369/30.03, 369/30.04, 30.08, 47.19, 47.16, 53.21; 386/125, 386/95; 715/716; 707/3; 709/219
See application file for complete search history.

(56) References Cited

U.S. PATENT DOCUMENTS

| | | |
|---|---|---|
| 2001/0007545 A1 | 7/2001 | Ueda et al. |
| 2003/0048719 A1 | 3/2003 | Kawashima et al. |
| 2003/0185128 A1 | 10/2003 | Shoji et al. |
| 2003/0235402 A1 | 12/2003 | Seo et al. |
| 2004/0213105 A1 | 10/2004 | Seo et al. |
| 2004/0213113 A1 | 10/2004 | Kim et al. |
| 2006/0222332 A1* | 10/2006 | Van Gestel et al. ............ 386/95 |

FOREIGN PATENT DOCUMENTS

| | | |
|---|---|---|
| EP | 1083560 A2 | 3/2001 |
| EP | 1227481 A1 | 7/2002 |
| EP | 1515340 A1 | 3/2005 |
| WO | 02080171 | 10/2002 |
| WO | 03063148 | 7/2003 |

* cited by examiner

*Primary Examiner*—Ali Neyzari

(57) ABSTRACT

A system includes a first manufacturing apparatus (510) for manufacturing a plurality of record carriers, such as DVDs, with a pre-recorded area storing the same content. A second manufacturing apparatus (520) stores an identifier in an identifier area of the record carriers. The identifier is unique for distinct groups of record carriers. Each group is associated with a distinct playlist. The playlists differ in at least a selection of content parts that can be accessed and/or a sequence in which content parts can be accessed. A reading device (530) includes means (532) for receiving a record carrier, means (536) for reading an identifier stored in the identifier area, means (537) for obtaining an associated playlist for the read identifier, and means (538) for providing access for rendering to content parts on the playlist.

10 Claims, 5 Drawing Sheets

ACCESSING PRE-RECORDED CONTENT ON A RECORD CARRIER

FIELD OF THE INVENTION

The invention relates to a system for providing access to pre-recorded content on a record carrier. The invention further relates to a reading device for use in the system. The invention also relates to a method of providing access to pre-recorded content on a record carrier.

BACKGROUND OF THE INVENTION

The capacity of removable record carriers increases continuously. At the same time, the manufacturing costs of a record carrier hardly increase or sometimes even decrease. Currently, DVD-based record carriers are a major way of distributing audio/video content. A dual-layer DVD can store 9.4 GBytes of digital content. Future removable record carriers, such as Blu-ray discs (BD), can store even more content. The costs of pre-recorded record carriers is thus increasingly determined by the content. Much effort has been spent on protecting the content, typically by using copy protection mechanisms based on cryptography. To decrypt the content, the reader needs to retrieve a decryption key. For DVD, a special identifier area on the disc, referred to as the Burst Cutting Area (BCA), has been defined on which additional information such as a serial number identifying the disc may be written. This number can be used to retrieve a decryption key. The disc is produced in a conventional mass-manufacturing process producing discs with the same pre-recorded content. In this process, also the BCA is produced, but not yet written to. In a separate process step, the identifier is written into the BCA, allowing for distinct codes to be written in the area.

Manufacturing costs of the disc are the same or very similar, irrespective of the amount of pre-recorded content. Increasingly, the capacity of the disc is getting so high that it may not be fully utilized or, if it were fully utilized, the content costs would make the disc prohibitively expensive.

OBJECT AND SUMMARY OF THE INVENTION

It is an object of the invention to provide a system and method of the type set forth that can better deal with the situation of relatively low manufacturing costs and relatively high content costs. It is a further object to better utilize the high capacity of pre-recorded record carriers.

To achieve the object of the invention, a system for providing access to pre-recorded content on a record carrier includes:

a first manufacturing apparatus for manufacturing a plurality of record carriers each with a pre-recorded area storing the same content including a plurality of content parts;

a second manufacturing apparatus for storing an identifier in an identifier area of the record carriers; the identifier being unique for distinct groups of the plurality of record carriers; each distinct group of record carriers being associated with at least one of a plurality of distinct playlists; the distinct playlists differing in at least a selection of content parts that can be accessed and/or a sequence in which content parts can be accessed; and a reading device including means for receiving a record carrier including an identifier area and a pre-recorded area; means for reading an identifier stored in the identifier area of the received record carrier; means for obtaining, for the read identifier, at least one associated playlist of content parts in the pre-recorded area; and means for providing access for rendering to content parts on the at least one playlist.

According to the invention, the mass-produced record carriers are arranged in groups, wherein each group is identified by a respective identifier written into the identifier area of the record carrier. Each group is associated with a respective playlist. The playlist defines a selection of content parts that may be rendered or a sequence in which content parts may be rendered. A reading device ("player") reads the identifier, retrieves the associated playlist(s) and provides access to only the content parts on the list. In this way, record carriers can be mass-produced with the same content that has been authored only once, whereas the different playlists provide the supplier with a full control of the content. The supplier may supply a playlist that only provides access to a limited part of the content. For example, it is possible to produce a single record carrier with audio content of all CDs (for example, ten different CDs) of an artist. By providing a separate playlist for each CD, it would appear to a consumer as if he bought just one CD, whereas he actually obtained an entire CD collection. In this example, ten distinct playlists and at least ten distinct identifiers would be required. By writing one of the identifiers to a record carrier, the record carrier would be linked to a playlist. It will be appreciated that a record carrier may be linked to more than one playlist (e.g. allowing the user to play content of two or more of the original CDs). The playlist thus provides a variation of playback of the content where the content is the same for all record carriers. The variation may be in the selection of the content that can be played back or in the sequence in which the content can be played back. For example, a record carrier with content of The Beatles' music and/or movies may contain a playlist with commentary by Paul McCartney and the sequence of content that matches his commentary. Another playlist may be based on Ringo Starr's commentary.

According to the measure defined in dependent claim 2, the number of playlists is smaller than the number of groups of record carriers. The reader converts the identifier stored in the identifier area to one or more playlist identifiers. This conversion hides the actual playlists. It is more difficult to observe from the identifier in the identifier area which playlist is the associated one, and it is more difficult to generate an identifier that corresponds to a specific playlist, reducing fraudulent use.

In a preferred embodiment as defined in dependent claim 3, the conversion includes hashing the group identifier to a playlist identifier. Without prior knowledge of the hashing being used (algorithm and/or hashing key), it is very difficult to predict which playlist would be associated with a certain identifier and to generate an identifier that corresponds to a desired playlist.

According to the measure defined in dependent claim 4, a program that obtains the playlist associated with the identifier is already included in the pre-recorded area of the record carrier. This is a simple and cheap way of equipping the reader device with-software for performing this task. Moreover, the program can be changed per title of the record carrier. The application program is preferably written for a virtual machine, such as the Java virtual machine, to be more platform-independent.

According to the measure defined in dependent claim 5, the identifier is written into a write-once area. This provides flexibility in assigning identifiers and choosing the playlist(s) that is or are going to be active for the record carriers. Such a decision can be made after mass-production of the carrier with the pre-recorded content. Advantageously, such a write-once area cannot usually be written to by conventional consumer equipment, thus reducing the chance of illegal copying. Moreover, the identifier can also be used for copy protection of the content, allowing revocation of identifiable record carriers. For systems in which the identifier is a pre-recorded area, this area should be of a type that is not suitable for copying with conventional consumer-copying techniques (e.g. outside data areas that can be read as data for rendering).

According to the measure defined in dependent claim 6, the record carrier is an optical storage medium, such as a DVD or Blu-Ray disc. Such record carriers are very suitable for distribution of large amounts of audio and/or video. For DVD-ROM and BD-ROM, a Burst Cutting Area (BCA) has been defined/proposed. It is preferred to use this area for storing the identifier since professional machines are available to write the code and since there are consumer players that are able to read the code (but conventional consumer recorders will not be able to copy the code).

In a preferred embodiment as defined in claim 7, the identifier is unique per record carrier. For example, the same unique identifier may be used as that used for controlling the copyright protection (e.g. the so-called disc identifier of DVD). In this way, no further processing step is required for record carriers that already have a unique identifier. The reader only needs to be able to convert the unique record identifier into a playlist identifier (e.g. using hashing as described above).

To achieve the object of the invention, a method of providing access to pre-recorded content on a record carrier comprises the steps of:

receiving a record carrier including an identifier area and a pre-recorded area; the pre-recorded area storing a plurality of content parts; the identifier area storing an identifier of the record carriers; the identifier being unique for distinct groups of the plurality of record carriers; each distinct group of record carriers being associated with at least one of a plurality of distinct playlists; the distinct playlists differing in at least a selection of content parts that can be accessed and/or a sequence in which content parts can be accessed;

reading an identifier stored in the identifier area of the received record carrier;

obtaining, for the read identifier, at least one associated playlist of content parts in the pre-recorded area; and providing access for rendering to content parts on the at least one playlist.

To achieve the object of the invention, a computer program product is operative to cause a processor to:

read an identifier stored in an identifier area of a record carrier; the identifier being unique for distinct groups of a plurality of record carriers; each distinct group of record carriers being associated with at least one of a plurality of distinct playlists; the distinct playlists differing in at least a selection of content parts that can be accessed and/or a sequence in which content parts can be accessed;

obtain, for the read identifier, at least one associated playlist of content parts in a pre-recorded area of the record carrier; and provide access for rendering to content parts on the at least one playlist.

These and other aspects of the invention are apparent from and will be elucidated with reference to the embodiments described hereinafter.

DESCRIPTION OF EMBODIMENTS

Figure 1:
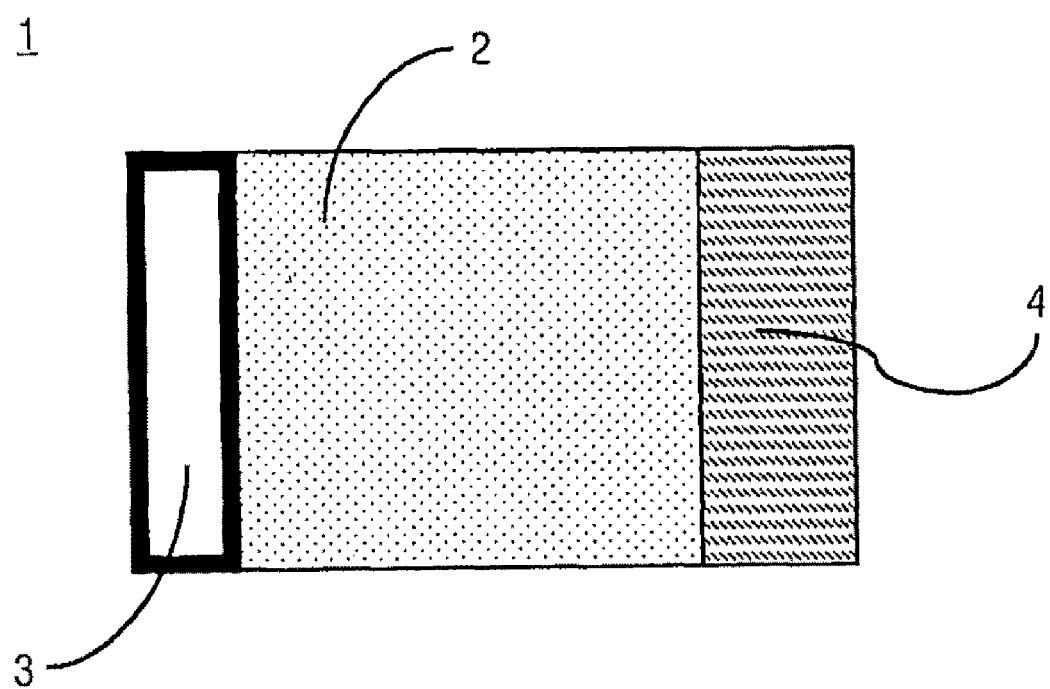
FIG. 1 shows a record carrier with an identifier area.

FIG. 1 shows a record carrier 1 including a data area 2 for storing content. The content may be stored optically, as in CDs, DVDs and Blu-Ray Discs (BD), magnetically, as in banking cards or on chip, as in Flash Memory and other types of ROM for, e.g. game computer cartridges. Other suitable forms of non-volatile memories may also be employed. The content may comprise video, audio, interactive computer programs, games or combinations of these. If desired, a part of the data area 2 is not pre-recorded but arranged to enable a user to store information, as in CD-Rs or memory sticks. For cost efficiency, preferably large volumes of identical record carriers are produced, in which case the data areas 2 of all record carriers are of a pre-recorded type, comprising the same content, such as a movie picture, a video game or a music album. In such an approach, the content needs to be authored only once.

Additional to the data area 2, the record carrier 1 according to the invention comprises an identifier area 3. The identifier area is preferably of a write-once type. In such a case, data can be written on the identifier area 3 before or after mass-production of the record carrier in a separate writing process. The data on the identifier area may represent all sorts of information. For example, each copy of the record carrier 1 may comprise a unique identification number, which may be used for decrypting copy-protected content on the data area 2 or a serial number for allowing future retrieval of information concerning the production of the record carrier 1. The code may be applied in many suitable ways, such as optically, magnetically or on chip. The code may be realized, for example, as a series of numbers or other characters or as a bar code. If desired, the identifier area 3 may be alternatively of a pre-recorded type and may be produced at the same time as the content in the data area 2. This limits the flexibility of the system but would still allow cost-effective production of some batches of record carriers with the same content but different identifiers IDs, saving on authoring costs. The remainder of the description will focus on using a write-once type of identifier area.

The record carrier may also comprise one or more additional areas 4 for additional functions, such as storing some specific data, comprising visual information or shaping the mechanical structure of the record carrier 1. These areas are not part of the invention and will not be further described here.

Each record carrier used in the invention has a pre-recorded data area 2 that has the same content including a plurality of content parts. In this context, content may be any type of multi-media content, such as audio, video, images (photos, graphics, etc.), text, etc. The type of content and coding of such content is irrelevant for the invention. Content part is understood to mean any part of such content that a user may want to access directly through a playlist. This may be, for example, an audio track, a video chapter or title, a still image, a textual book or book chapter, etc.

Figure 2A:
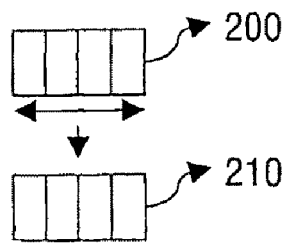
FIG. 2 shows mapping of a record carrier identifier to a group identifier.
Figure 2B:
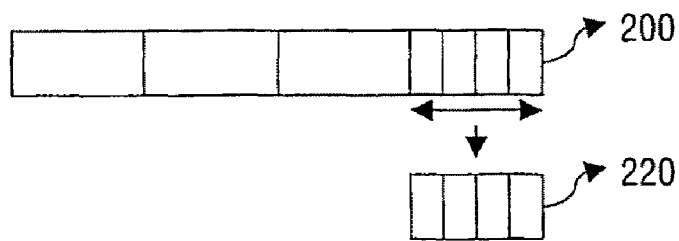
Figure 2C:
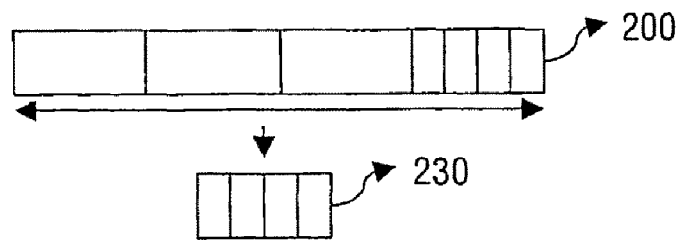

According to the invention, the identifier area 3 of the record carrier is provided with an identifier that is unique for distinct groups of the plurality of record carriers. Consequently, if there are ten distinct groups, there are at least ten distinct identifiers. It is possible to use more unique identifiers than there are distinct groups. In a preferred embodiment, the identifier is unique for the record carrier. Since typically only a limited number of groups needs to be distinguished, the unique record carrier identifier is then converted to a unique identifier that identifies the group. Any suitable conversion mapping of a larger range to a smaller range may be used. Simple ways of doing this would be a DIV (division with truncation to an integer) or MOD (remainder after division) operation. In a preferred embodiment, hashing is used to this end. Any suitable hashing algorithm may be used. A cryptographically safe hashing algorithm is preferably used. In any case, the identifier written to the record carrier thus uniquely identifies a group of record carriers, either via a direct one-to-one mapping (e.g. the identifier on the record carrier is the group identifier) or after converting the identifier on the record carrier to a 'smaller' identifier that has such a one-to-one relationship. FIG. 2A shows an example wherein the identifier 200 stored on the record carrier directly gives the unique group identifier 210. In this example, a four-bit identifier is used, allowing a distinction of sixteen groups of record carriers. It will be appreciated that in this example the identifier uniquely identifies the group but does not uniquely identify the record carrier (there may be many record carriers with the same identifier). FIGS. 2B and 2C show examples wherein the identifier 200 stored on the record carrier uniquely identifies the record carrier and after conversion/mapping also gives the unique group identifier 220. In FIG. 2B, a simple mapping is used: the four least significant bits are used (possibly after performing a permutation or other cryptographic hiding operation). In FIG. 2C, a hashing operation is used that converts the entire identifier 200 with more than four bits into a four-bit group identifier 230.

Figure 3A:
FIG. 3 shows linking a group identifier to a playlist.
Figure 3B:
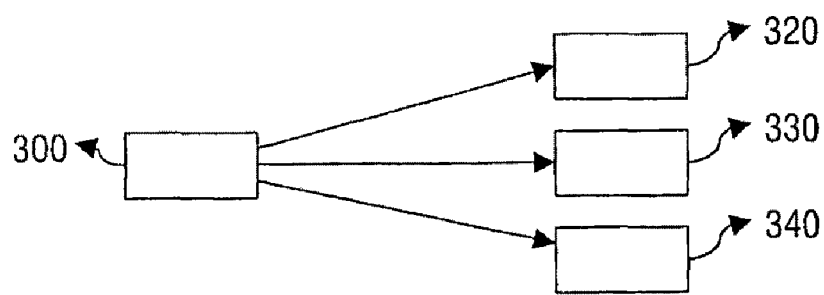

According to the invention, each distinct group of record carriers is associated with at least one of a plurality of distinct playlists. The distinct playlists differ in at least a selection of content parts that can be accessed and/or a sequence in which content parts can be accessed. Typically, a group is associated with one playlist. This is illustrated in FIG. 3A. In this example, the group identifier 300 is identical to a playlist identifier 310. If desired, a group may also be associated with more than one playlist. For example, if the record carrier includes the content of several audio CDs and also includes the original playlists of all these CDs, then the group identifier may be associated with one or more of these lists (even with all of them). FIG. 3B shows an example wherein the group identifier 300 is associated with (linked to) three different playlists 320, 330, and 340. Each playlist defines a respective sequence of content parts. Persons skilled in the art can easily perform such a linking operation.

Figure 4:
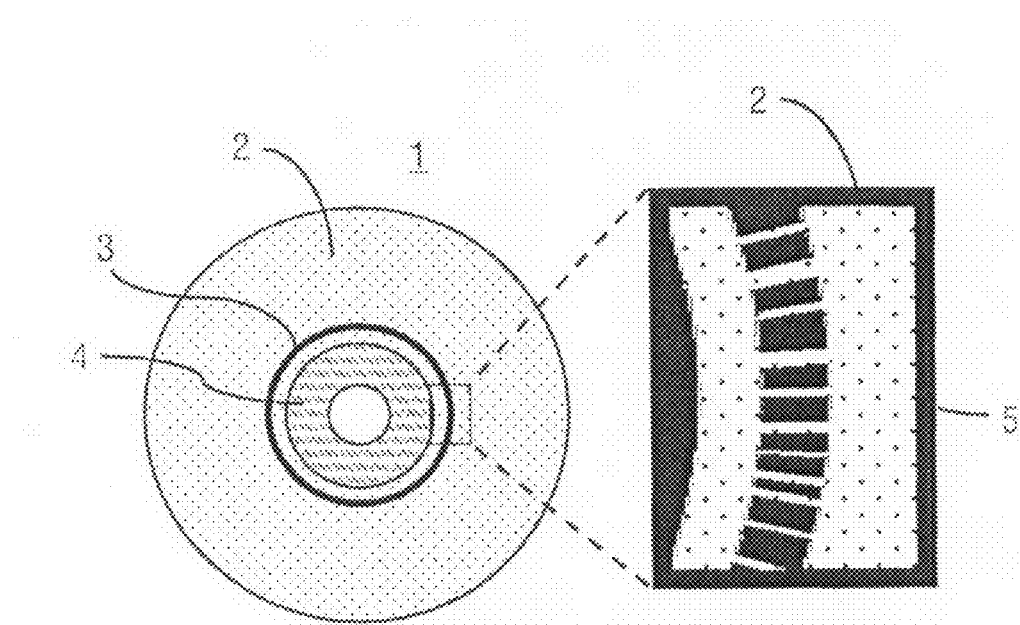
FIG. 4 shows a DVD disc with a Burst Cutting Area.

FIG. 4 shows an embodiment of the record carrier 1 according to the invention. In this embodiment, the record carrier 1 is a DVD, but similar embodiments for other optical storage media, such as CDs (Compact Disc) or BDs (Blu-ray Disc), can be realized. DVDs optionally comprise a Burst Cutting Area (BCA) on which additional information such as serial numbers may be written. The BCA is perfectly suited to serve as the identifier area 3 for holding the identifier according to the invention. The DVD 1 is an optical storage medium for storing digital content such as audio and/or video data. The DVD 1 may also comprise computer programs for performing title-specific tasks, such as enabling user interactivity. Such programs are preferably written for execution on a virtual machine, such as the Java virtual machine. The pre-recorded content is stored on the data area 2 of the DVD 1.

The BCA 3 may be situated inside the data area 2. For example, the BCA 3 may be an annular area inside the data area 2, near the center of the DVD 1. Alternatively, the BCA 3 may be situated outside the data area 2 or in between two separate data areas. For DVD, the BCA may contain data in the form of a bar code. The bar code 5 may be written during mastering and will then be common for all discs from that master, or it may be written into the aluminum reflective layer of the DVD 1 after mastering, e.g. using a laser. Using the first technique, the area 3 is pre-recorded. The number of distinct identifiers that can then be produced is limited, because each identifier will require a separate master. The second technique is preferably used, wherein the area is a write-once area in which the identifier is written in a separate manufacturing step. Techniques other than laser-writing may also be used to write the bar code on the disc, such as ink-jet printing. If the bar code 5 is not yet applied to the disc during the mastering process, optical discs can be given unique bar codes 5. The data stored in the BCA 3 of a standard DVD 1 may be four data units each consisting of 16 bytes, but the BCA 3 may comprise other amounts of data in other optical media.

Figure 5:
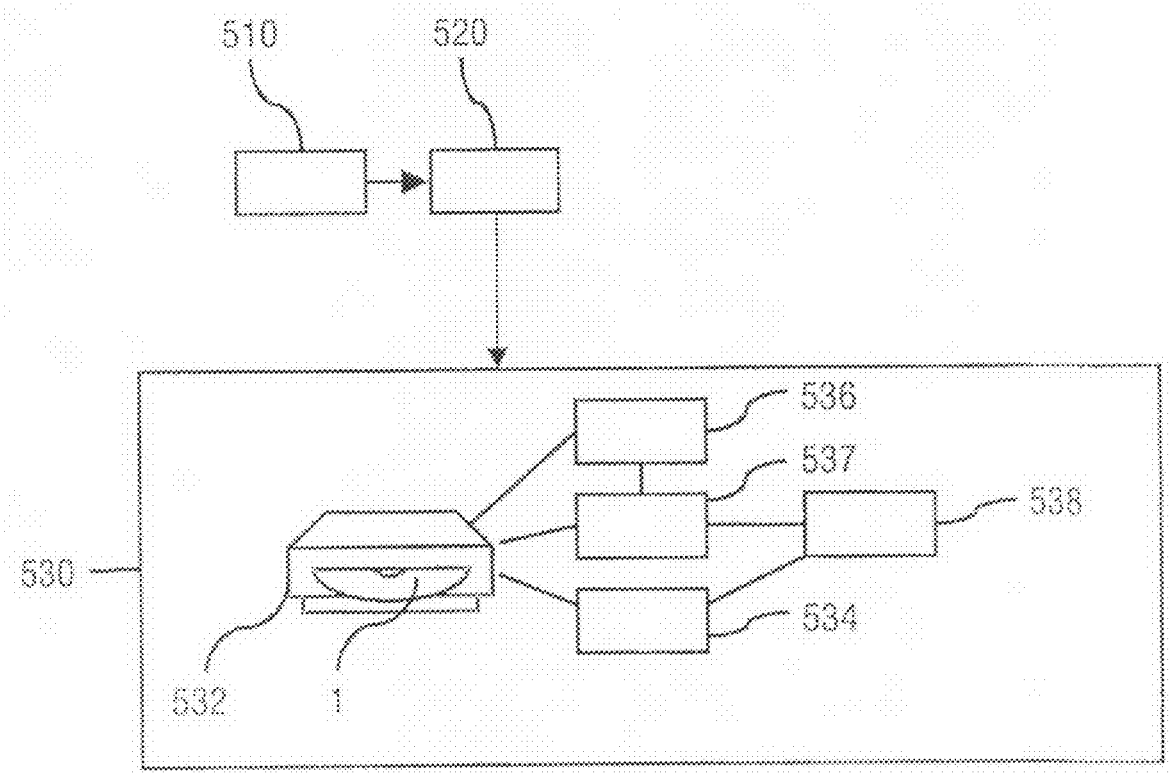
FIG. 5 is a schematic representation of the system according to the invention.

FIG. 5 is a block diagram of a system according to the invention. The system comprises two machines for manufacturing the optical disc 1, but these two machines may be integrated in one multi-purpose machine. The first machine 510 produces the optical disc 1 provided with audio and/or video data and/or computer programs stored on the pre-recorded area 2. A second machine 520 writes an identifier into the identifier area 3 (e.g. a bar code 5 on the BCA 3). The BCA 3 is usually written by a very powerful laser (YAG or CO2) that burns and darkens the aluminum or other reflective metal layer in the center of the optical disc 1. These marks have a decreased reflectivity. Other suitable writing techniques and writing machines may be used for other types of identifier areas. The BCA 3 does not necessarily have to be written by the manufacturer of the record carrier. The BCA writing machine 520 may alternatively be owned and operated by a rental chain, retailer or distributor. The system further includes a reading device 530. The reading device includes means 532 for receiving a removable record carrier 1. It will be understood that such receiving means are specific for the type of media used. For example, an optical drive with a tray is typically used for an optical storage medium. Other suitable reception means should be used for other media. The reading device 530 also has means 534 for reading content stored in the identifier area of the received record carrier for rendering. Again, such means are well-known and will not be further described here. Furthermore, the reading device 530 has means 536 for reading the identifier stored in the identifier area of the received record carrier 1. Suitable means for reading such codes fall within the skills of a skilled person and have already been defined for optical storage media. For example, an optical disc player 530 may read the BCA 3 by rotating at a constant angular velocity (1440 rpm), moving the optical pickup to the BCA 3, focusing on the information surface, and using a decoding circuit. The reading device 530 also has means 537 for obtaining, for the read identifier, at least one associated playlist of content parts in the pre-recorded area. The playlists may be stored in the pre-recorded area 2 of the record carrier, for example, each identified by a playlist identifier. In this case, the means 537 has to convert the read identifier to a playlist identifier and retrieve the associated playlist from the record carrier. If desired, the playlist may also be stored in another storage medium, such as a website of the supplier of the disc. In this case, the record carrier may include an identifier identifying such a storage medium (e.g. a URL) enabling the means 537 to retrieve the list from the identified storage medium. In such a scenario, the playlist may even be changed dynamically (e.g. if the user pays additionally, a larger playlist is provided or more playlists are provided). The means 537 may be implemented, using a processor loaded with a suitable program. Such a program may already be present in the reading device 530 (e.g. in ROM), or may be read from the record carrier, or loaded from another storage medium, such as a web server. The reading means 530 also includes means 538 for providing access for rendering to content parts on the at least one playlist. This can easily be achieved, because player devices are usually already equipped to only render content on a playlist.

Figure 6:
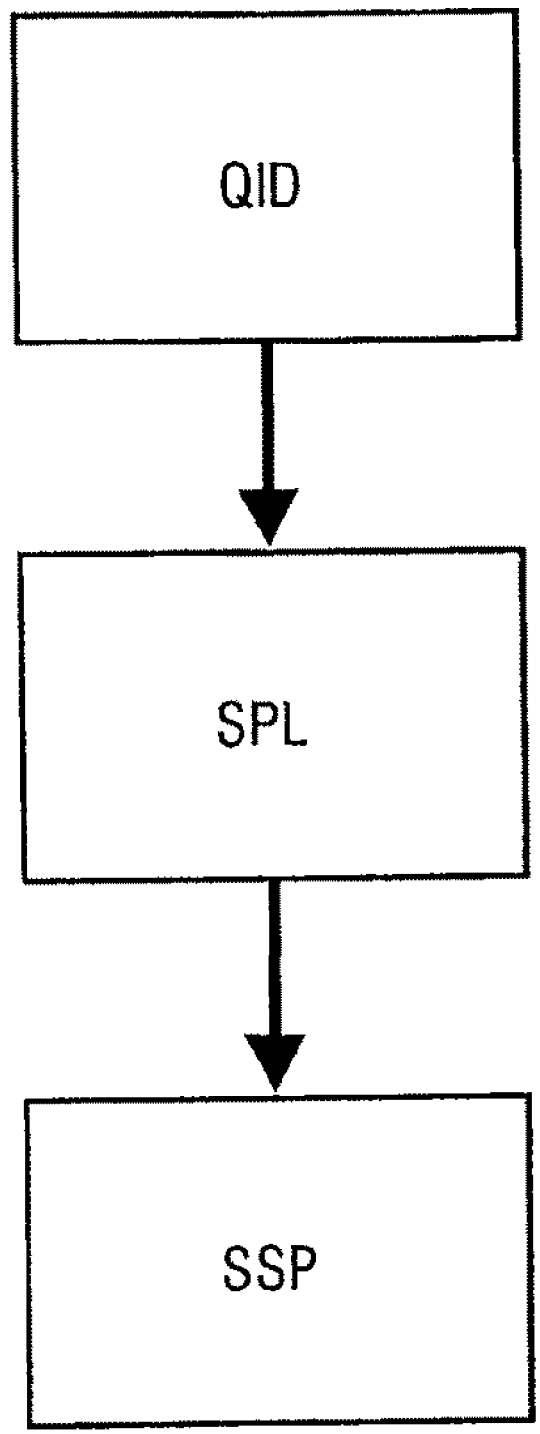
FIG. 6 schematically shows the process of accessing the content.

FIG. 6 is a flow diagram of the method according to the invention as performed by an application program. As described above, such a program is preferably retrieved from the record carrier before playback of the data in the data area. The application program may be initiated by a stand-alone player or a player integrated in a larger system, such as a personal computer (PC). The player hardware or driver software of the player is capable of interpreting a code on the data area of the record carrier, coding the application program. The application program is preferably written in a standard coding language, e.g. Java, so that it can be run by a standard player. In a first step QID, the application program causes a processor to query the player for the value of the identifier (ID). Using this ID, the application program selects a playlist from a set of playlists, in a subsequent step SPL. The playlist to be selected may be directly coded in the identifier area (e.g. BCA) or the selection may be done by mapping the identifier to one of a number of options. For example, a lookup table may be used for linking the ID to a playlist, or a hashing function may be used to map the IDs to a smaller set of choices. The playlists determine the way in which the user can view the content of the record carrier. In the subsequent step SSP, the application program causes the processor to show the selected playlist(s) to the user so as to enable the user to play the items on the playlist. For example, a DVD comprises a documentary of The Beatles. Depending on the ID, the disc will either play back those parts of The Beatles' music which Paul McCartney considers most important. If a user has a disc with another ID, the application will select playback of the playlist that shows the documentary from Ringo Starr's viewpoint, etc. Both discs may comprise the same data content, but it depends on the disc ID which data content is presented to the user and in which order or context.

If the manufacturer controls which IDs are applied to the record carriers, he knows in advance which discs have which properties. Different record carriers may be packaged differently. A manufacturer may sell several copies of record carriers comprising the same data content, but different disc IDs to one consumer. The manufacturer would only have to author and produce one record carrier while selling multiple ones, thus saving production costs. If the IDs are assigned randomly and no explicit testing is done, even the manufacturer would not know which playlist can be played from a particular disc, and different record carriers may be packaged identically. This would make it attractive for consumers to collect and swap record carriers to get all the different variations.

Figure 7:
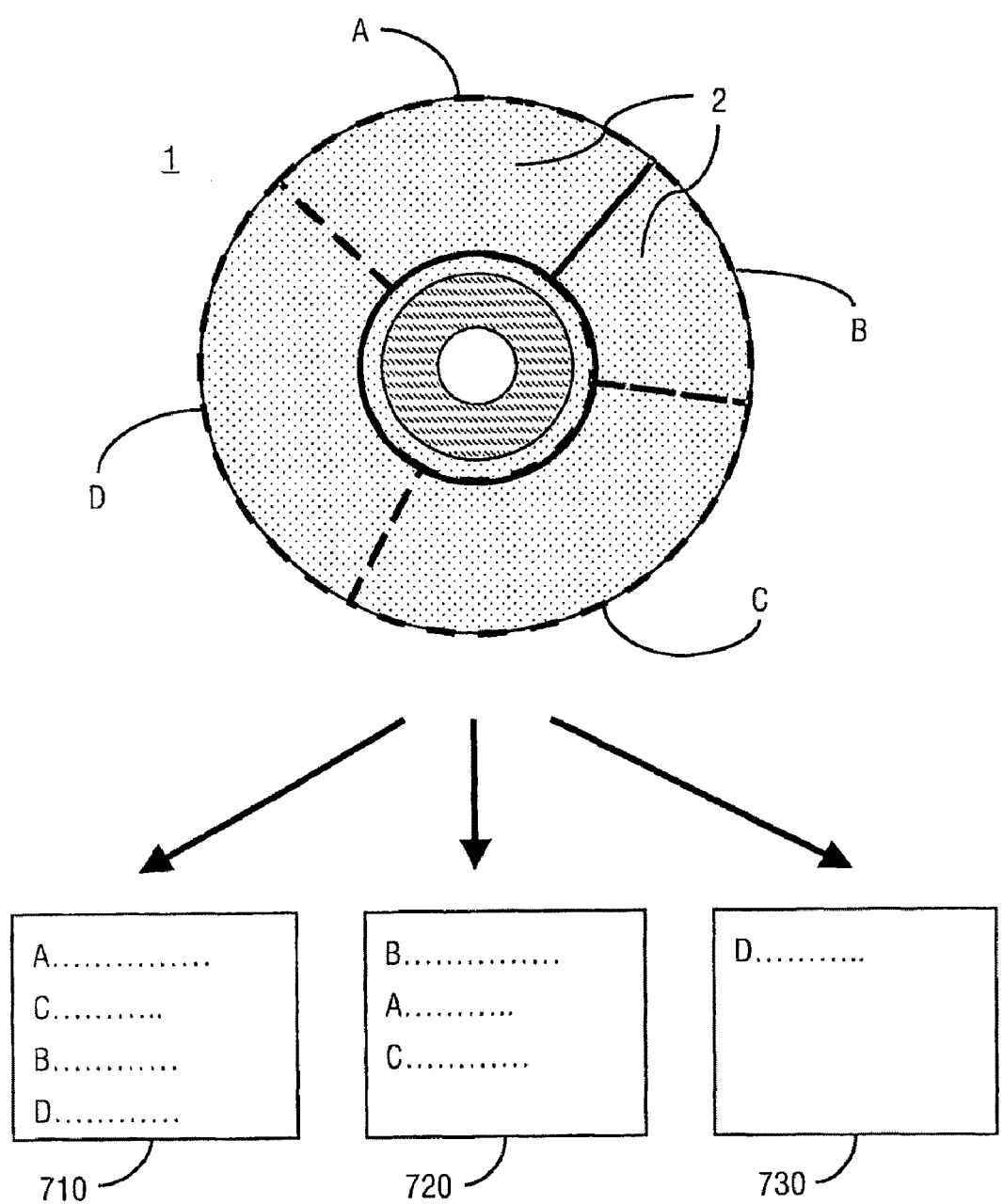
FIG. 7 is a schematic representation of a disc according to the invention.

FIG. 7 is a schematic representation of a disc 1 according to the invention. The data area 2 of the disc 1 comprises four content titles A, B, C and D. For example, a first title A comprises a movie picture, a second title B comprises trailers for other movie pictures, a third title C comprises a 'making of' documentary about the production of the movie picture of the first title A and a fourth title D comprises the music used in the movie picture of the first title A. Depending on the ID on the BCA, one of the three playlists 710, 720 and 730 is presented to the user. A first playlist 710 enables the user to play all four titles A, C, B and D. A second playlist 720 only presents the video titles B, A and C to the user. Discs presenting the shorter playlist 730 may be sold at a lower price than discs presenting the longer playlist 710. A third playlist 730 may only present the title D comprising the music from the movie picture. Discs comprising different IDs may be packaged differently and may even be sold by different shops. Discs presenting only music may be sold, for example, at music shops, while discs presenting only video may be sold at video shops or rented from video rentals.

It will be appreciated that the invention can also be extended to computer programs, particularly computer programs on or in a carrier, adapted to put the invention into practice. The program may be in the form of a source code, an object code, a code intermediate source and object code such as a partially compiled form, or in any other form suitable for use in the implementation of the method according to the invention. The carrier may be any entity or device capable of carrying the program. For example, the carrier may include a storage medium, such as a ROM, for example, a CD ROM or a semiconductor ROM, or a magnetic recording medium, for example, a floppy disc or hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform or to be used in the performance of the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than-those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for providing access to pre-recorded content on a record carrier; the system including:
 a first manufacturing apparatus for manufacturing a plurality of record carriers each with a pre-recorded area storing a same content including a plurality of content parts;
 a second manufacturing apparatus for storing an identifier in an identifier area of the record carriers; the identifier being unique for distinct groups of the plurality of record carriers; each distinct group of record carriers being associated with at least one of a plurality of distinct playlists; the distinct playlists differing in at least a selection of content parts that can be accessed and/or a sequence in which content parts can be accessed; and a reading device including:

means for receiving a record carrier including an identifier area and a pre-recorded area;

means for reading an identifier stored in the identifier area of the received record carrier;

means for obtaining, for the read identifier, at least one associated playlist of content parts in the pre-recorded area; and means for providing access for rendering to content parts on the at least one playlist.

2. A system as claimed in claim 1, wherein the number Of distinct playlists is smaller than the number of distinct groups of record carriers, and the means for obtaining an associated playlist for the read identifier is arranged to convert the read identifier into a playlist identifier identifying the at least one associated playlist.

3. A system as claimed in claim 1, wherein the conversion includes hashing the read identifier.

4. A system as claimed in claim 1, wherein the pre-recorded area of the record carrier includes an application program executable by the reading device for performing the operation of obtaining the at least one associated playlist.

5. A system as claimed in claim 1, wherein the identifier area is of a write-once type.

6. A system as claimed in claim 5, wherein the record carrier is of an optical storage type and the identifier area is a burst cutting area.

7. A system as claimed in claim 1, wherein the identifier is unique for the record carrier.

8. A reading device for use in the system as claimed in claim 1, the reading device including:

means for receiving a record carrier including an identifier area and a pre-recorded area; the pre-recorded area storing a plurality of content parts; the identifier area storing an identifier of the record carriers; the identifier being unique for distinct groups of the plurality of record carriers; each distinct group of record carriers being associated with at least one of a plurality of distinct playlists; the distinct playlists differing in at least a selection of content parts that can be accessed and/or a sequence in which content parts can be accessed;

means for reading an identifier stored in the identifier area of the received record carrier;

means for obtaining, for the read identifier, at least one associated playlist of content parts in the pre-recorded area; and means for providing access for rendering to content parts on the at least one playlist.

9. A method of providing access to pre-recorded content on a record carrier; the method comprising the steps of:

receiving a record carrier including an identifier area and a pre-recorded area; the pre-recorded area storing a plurality of content parts; the identifier area storing an identifier of the record carriers; the identifier being unique for distinct groups of the plurality of record carriers; each distinct group of record carriers being associated with at least one of a plurality of distinct playlists; the distinct playlists differing in at least a selection of content parts that can be accessed and/or a sequence in which content parts can be accessed;

reading an identifier stored in the identifier area of the received record carrier;

obtaining, for the read identifier, at least one associated playlist of content parts in the pre-recorded area; and providing access for rendering to content parts on the at least one playlist.

10. A computer readable physical media containing detectable variations of physical properties of the media, the variations controlling the operation of a processor of a reading device for causing the processor to operate the reading device to:

read an identifier stored in an identifier area of a record carrier; the identifier being unique for distinct groups of a plurality of record carriers; each distinct group of record carriers being associated with at least one of a plurality of distinct playlists; the distinct playlists differing in at least a selection of content parts that can be accessed and/or a sequence in which content parts can be accessed;

obtain, for the read identifier, at least one associated playlist of content parts in a pre-recorded area of the record carrier; and provide access for rendering to content parts on the at least one playlist.

* * * * *